United States Patent [19]

Umezawa et al.

[11] Patent Number: 5,247,832
[45] Date of Patent: Sep. 28, 1993

[54] VIBRATOR-TYPE LEVEL SENSOR

[75] Inventors: Takayuki Umezawa, Daitoh; Takao Kawakita, Osaka, both of Japan

[73] Assignee: Nohken Inc., Japan

[21] Appl. No.: 836,648

[22] Filed: Feb. 14, 1992

[30] Foreign Application Priority Data

Feb. 14, 1991 [JP] Japan .................. 3-106964

[51] Int. Cl.⁵ .............................. G01F 23/28
[52] U.S. Cl. ................... 73/290 V; 340/621
[58] Field of Search ............ 340/621; 73/290 V; 310/321, 323

[56] References Cited

U.S. PATENT DOCUMENTS

| | | | |
|---|---|---|---|
| 2,990,482 | 6/1961 | Kenny | 310/323 |
| 3,256,738 | 6/1966 | Giacomo et al. | 73/290 V |
| 3,266,311 | 8/1966 | Andreasen et al. | 340/621 |
| 3,312,107 | 4/1967 | Burns et al. | 73/290 V |
| 3,625,058 | 12/1971 | Endress et al. | 73/290 V |
| 4,170,135 | 10/1979 | Booman et al. | 73/290 R |
| 4,170,765 | 10/1979 | Austin et al. | 73/290 V |
| 4,193,291 | 3/1980 | Lynnworth . | |
| 4,202,049 | 5/1980 | Wetzel | 73/290 V |
| 4,213,337 | 7/1980 | Langdon | 340/621 |
| 4,314,242 | 2/1982 | Kuru et al. | 340/621 |
| 4,325,416 | 4/1982 | Hermann | 73/290 V |
| 4,499,765 | 2/1985 | Benz et al. | 73/290 V |
| 4,540,981 | 9/1985 | Lapentina et al. | 310/321 |
| 4,594,584 | 6/1986 | Pfeiffer et al. | 310/323 |
| 4,644,789 | 2/1987 | Snyder | 310/321 |
| 4,740,726 | 4/1988 | Umezawa | 340/621 |
| 4,785,663 | 11/1988 | Hermann | 340/621 |
| 5,099,454 | 3/1992 | Dieulesaint et al. | 340/621 |

FOREIGN PATENT DOCUMENTS 2152665 8/1985 United Kingdom .
2200450 8/1988 United Kingdom .

*Primary Examiner*—William A. Cuchlinski, Jr.
*Assistant Examiner*—Diego F. F. Gutierrez
*Attorney, Agent, or Firm*—Darby & Darby

[57] ABSTRACT

In a vibrator-type level sensor, a detection pipe (14) is provided projecting from a base unit (1) to be mounted to a wall of a container (8) containing a substance (100) to be detected. The detection pipe (14) has an internal vibration plate (12) attached with a vibrating piezoelectric device (16) thereon and the internal vibration plate (12) is mechanically connected through an end cap (13) to the free end of the detection pipe (14, 140) to form a folded cantilever unit (30) which responds when the end cap (13) or pipe (14) are contacted by the material being sensed in the container.

4 Claims, 8 Drawing Sheets

VIBRATOR-TYPE LEVEL SENSOR

FIELD OF THE INVENTION AND RELATED ART STATEMENT

1. Field of the Invention

The present invention relates to a vibrator-type level sensor for detecting a level of powdery, granular matter or liquid as substance to be detected in a container, vessel and so on.

2. Description of the Related Art

FIG. 10 shows a sectional view of a typical conventional vibration-type level sensor which is mounted to a container 8. The container 8 contains powdery or granular matter or liquid as the substance to be detected. The conventional vibration-type level sensor detects the level of such substance by touching of a contact part 2a which is provided projecting from a main body 50 of the vibration-type level sensor. The contact part 2a is formed in a bar shape together with a detection part 2b. The detection part 2b is arranged in a tubular part 4 of the main body 50. The contact part 2a and the detection part 2b constitute a metal vibration member 2 which is supported at its center by a thin diaphragm 3. The thin diaphragm 3 is provided to close the end of the tubular part 4 which is mounted to project inside of the container 8. The conventional vibrator-type level sensor is fixed to the container 8 for containing the substance to be detected by tightening a screw portion 4a of the tubular part 4 to a wall of the container 8 with a nut 5.

The above-mentioned metal vibration member 2 has a vibrating piezo-electric device 6 and a receiving piezo-electric device 7 on the detection part 2b thereof. The vibrating piezo-electric device 6 vibrates the metal vibration member 2. This vibration of the metal vibration member 2 is detected and converted into electric signal by the receiving piezo-electric device 7. The converted electric signal is amplified by an amplifier circuit which is provided in the main body 50, thereafter the amplified electric signal is impressed to the vibrating piezo-electric device 6. As a result, the metal vibration member 2 keeps oscillating at a frequency determined in accordance with an eigenfrequency of the metal vibration member 2.

When the contact part 2a of the metal vibration member 2 touches the powdery or granular matter or liquid substance to be detected, the vibration of the contact part 2a stops or decreases because of the resistance of the material. The change of the vibration of the contact part 2a is detected and converted to an electric signal by the receiving piezo-electric device 7 which is attached to the detection part 2b in the tubular part 4. A detecting circuit, which is provided in the main body 50, detects the change of the vibration by receiving the electric signal from the receiving piezo-electric device 7. As mentioned above, the conventional vibrator-type level sensor is designed to detect the existence of the substance around the contact part 2a by means of detecting the change of the vibration of the detection part 2b.

Accordingly, the conventional vibrator-type level sensor detects whether the substance to be detected reaches the predetermined level in the container 8 or not, on the condition that the projecting detection part 2b on the inside of the container 8 be vibrated in the same manner as the contact part 2a arranged in the tubular part 4.

In case where the powdery or granular substance is tightly filled in a container and contacts the contact part 2a, there may arise a case that the detection part 2a of the metal vibration member 2 is only vibrated by self-vibration when the vibration of the contact part 2a is strongly restricted or stopped by contacting the substance to be detected. Therefore, when the contact part 2a is caught by the substance to be detected, the conventional vibrator-type level sensor is likely to output erroneous data that the substance to be detected has not yet reached the predetermined level in the container 8.

And further, in the conventional vibrator-type level sensor, there are some cases that the vibration mode of the metal vibration member of the vibrator-type level sensor is reduced or stopped owing to a structure, material or weight of the container 8 where the vibrator-type level sensor is mounted, or by the manner of the mounting to the container 8.

In the above-mentioned cases, the operating condition of the conventional vibrator-type level sensor must be adjusted so as to increase the vibration or to compensate the vibration mode. In order to compensate the damped vibration owing to mounting on a container etc., a vibration force produced by the vibrating piezo-electric device 6 must be adjusted to be stronger, or an amplification rate of the amplifier circuit must be made greater in response to the condition of the container etc. Also, the adjustment works for the conventional vibrator-type level sensor must be conducted at the installation site. However, it is very difficult to adjust the vibrator-type level sensor, because of possible induction of an erroneous operation such that the detection part 2b of the metal vibration member 2 is likely to make an irregular vibration only at the detection part 2b by increase of the amplification rate of the amplifier circuit.

OBJECT AND SUMMARY OF THE INVENTION

An object of the present invention is to provide a vibrator-type level sensor which can achieve a high precision for detecting a level of material to be detected, and can be applicable to containers of various kinds without complicated individual adjustment.

In order to achieve the above-mentioned object, the vibrator-type level sensor of the present invention comprises:

a detection pipe unit, one end of which is fixed to a base unit as a fixed end, and the other end is closed by an end cap constituting a free end, an internal vibration member which is disposed in the detection pipe unit and has an oblong rectangle bar shape fixed by its one end to the end cap leaving the other end thereof as a free end, vibrating means, which is fixed to the internal vibration member, to vibrate the internal vibration member, to make a folded cantilever unit formed by the detection pipe, the end cap, and the internal vibration member vibrates in a folded cantilever vibration mode, and detection means, which is mounted in the end cap, to detect a change of the vibration of the folded cantilever unit.

According to the vibrator-type level sensor of the present invention, since an acceleration sensing device is provided in an end cap of a detection pipe of a vibrating folded cantilever unit, the vibrator-type level sensor can accurately detect whether a substance to be detected reaches a predetermined level in a container or not, even when the vibration of the detection pipe of the vibrating folded cantilever unit is attenuated and stopped by catching by a substance to be detected, such as powdery or granular substance.

And, since a change or attenuation of the vibration of the vibrating folded cantilever unit clearly appears at an end cap of the detecting unit, the change of the vibration can be detected precisely by the acceleration sensing device which is provided in the end cap.

In the vibrator-type level sensor of the present invention, since a base unit is arranged fixed to a wall of a container or the like as a fixed end, a vibration mode of the vibrator-type level sensor is kept constant without being influenced by configuration, material or weight of the container or the like, or by a manner of a mounting. And, there is no need to adjust or compensate in response to the vibration mode when the vibrator-type level sensor is mounted to a container on an installation site.

And further, since the contact part for contacting a material to be detected is formed in a tube shape, the vibrator-type level sensor is not likely to be bent by the material being sensed nor to be damaged during the in detecting time.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

First embodiment

Hereafter, a first embodiment of a vibrator-type level sensor of the present invention is described with reference to the accompanying drawings of FIGS. 1 to 7.

Figure 1:
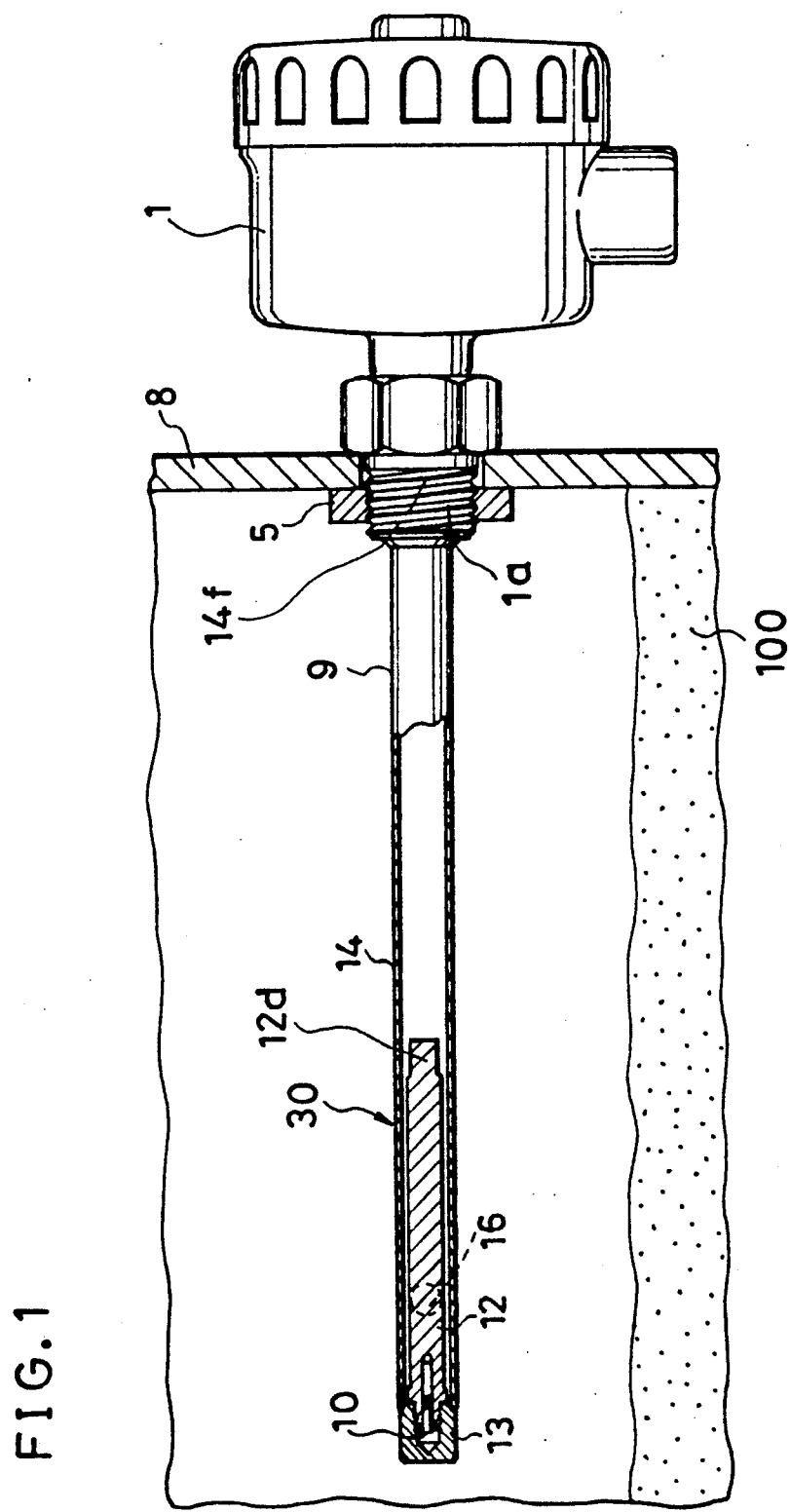
FIG. 1 is a side view, partly in cross section, of a vibrator-type level sensor of a first embodiment of the present invention.
Figure 2:
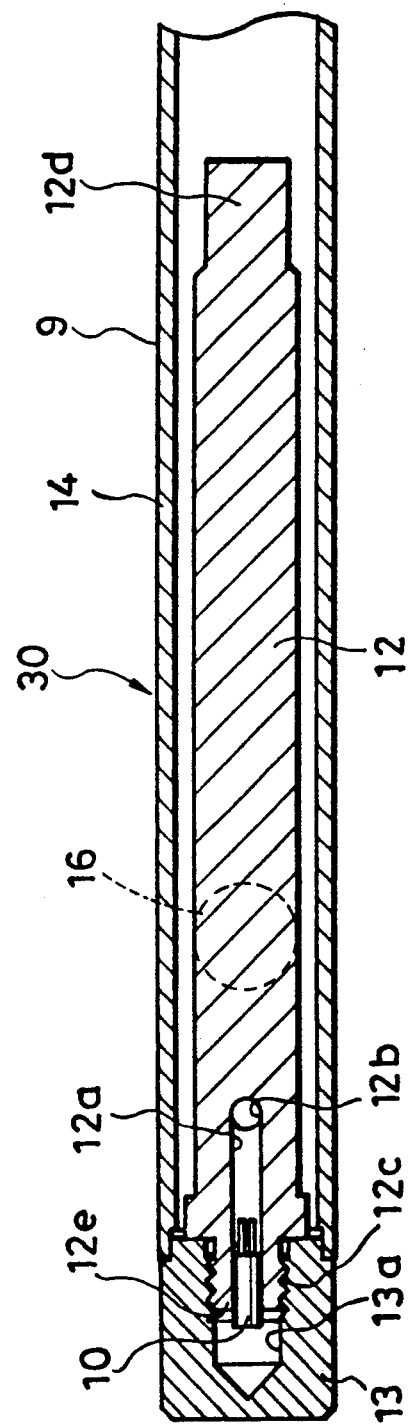
FIG. 2 is an expanded sectional view of the vibrator-type level sensor shown in FIG. 1.
Figure 3:
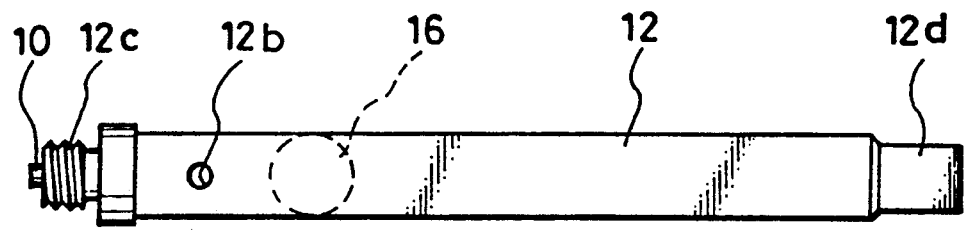
FIG. 3 is a side view showing an internal vibration plate of the vibrator-type level sensor shown in FIG. 1.
Figure 4:
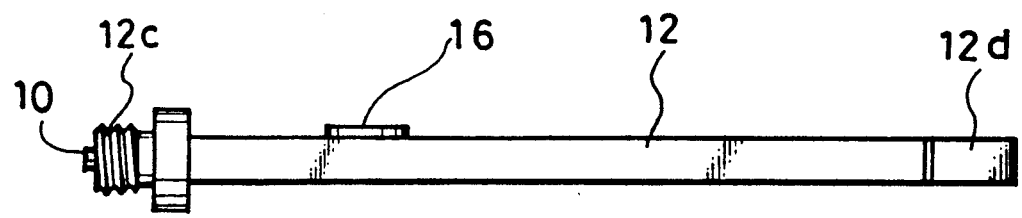
FIG. 4 is a plan view showing the internal vibration plate shown in FIG. 3.
Figure 5:
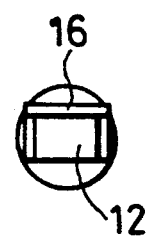
FIG. 5 is a rear view showing the internal vibration plate shown in FIG. 3.

FIG. 1 is a side view, partly in cross section, of a vibrator-type level sensor of the present invention. FIG. 2 is an expanded sectional view of the vibrator-type level sensor shown in FIG. 1. FIG. 3 is a side view showing an internal vibration plate of the vibrator-type level sensor shown in FIG. 1. FIG. 4 is a plan view showing the internal vibration plate shown in FIG. 3. FIG. 5 is a rear view showing the internal vibration plate shown in FIG. 3.

As shown in FIG. 1, the vibrator-type level sensor of the first embodiment comprises a base unit 1 and a detection unit 9 projecting from the base unit 1. The base unit 1 is fixed to a wall of a container 8 which contains the material 100, such as powdery or granular substance or liquid to be detected. The detection unit 9 is arranged to project to the inside of the container 8 when the base unit 1 of the vibrator-type level sensor is mounted to the wall of the container 8. The base unit 1 contains an electric circuit (not shown) for operating the vibrator-type level sensor. The base unit 1 has a screw part 1a for mounting to the wall of the container 8 which contains the substance 100 to be detected. The vibrator-type level sensor is fixed to the container 8 by tightening a nut 5 to the screw part 1a, or by directly tightening the screw part 1a to a threaded hole of the wall of the container 8. The detection unit 9, which is arranged to project inside the container 8 extends through the wall when the vibrator-type level sensor is mounted, comprises a detection pipe 14, an end cap 13 and an internal vibration plate 12.

Apart from the above-mentioned embodiment wherein the detection pipe 14 which is made of stainless steel (SUS 304, SUS 316 or the like) is formed in a tube shape having a thin wall, a modified embodiment may be such that the detection pipe is made of titanium alloy, hastelloy, monel metal, inconel or iron steel (SS, SC or the like), considering the various degrees of concordance with the substance to be detected.

FIG. 2 shows a sectional view of an expanded detection pipe 14 near the end cap 13. As shown in FIG. 2, the end cap 13 has a bore 13a the center of which is arranged coaxially with the axis of the projected detection pipe 14. The bore 13a has a threaded portion to be screwed onto the internal vibration plate 12. The end cap 13 is welded to close a tip end of the detection pipe 14. A vibrator of the vibrator-type level sensor of the present invention is formed by the detection pipe 14, the end cap 13 and the internal vibration plate 12, and its vibration mode is equivalent to that of a folded cantilever type vibrator. Therefore, the vibrator of the present invention is referred to as a folded cantilever unit 30.

As shown in the sectional view of FIG. 2, the above-mentioned internal vibration plate 12, which is fastened to the end cap 13, has a tubular bore 12a for fixing an acceleration sensing device 10. The center axis of the bore 12a is aligned on the center axis of the projected detection pipe 14. The tubular bore 12a opens at the end tip 12e of the internal vibration plate 12, and the other end of the bore 12a leads to a transverse through-hole 12b. The through-hole 12b is bored penetrating through both side faces of the internal vibration plate 12. The acceleration sensing device 10 senses motion of the end cap 13.

The internal vibration plate 12 is shown in FIGS. 3 to 5. FIG. 3 shows a side view of the internal vibration plate 12, and FIG. 4 shows a plan view and FIG. 5 shows a rear view. As shown in FIGS. 3 to 5, one end of the internal vibration plate 12 has a threaded part 12c for attachment to the end cap 13. When the internal vibration plate 12 is attached to the inside of the end cap 13, the other end of the internal vibration plate 12 is arranged as a free end in the detection pipe 14. Therefore, the above-mentioned folded cantilever unit 30 of the first embodiment consists of the detection pipe 14, the end cap 13 and the internal vibration plate 12. The free end of the internal vibration plate 12 is formed to have a narrow part 12d, so that the narrow part 12d is used for engagement by a tightening tool in the assembling operation. The vibrating device 16, such as a piezo-electric device which is made of lead titanate-lead zirconate ($PbTiO_3$-$PbZrO_3$) as a main component, is provided on a side face of the internal vibration plate 12. The vibrating device 16 is mounted at a position where a distance from the end tip of the internal vibration plate 12 is 20%–30% of the full length of the internal vibration plate 12. The vibrating device 16 is electrically connected through lead wires (not shown) to the electric circuit which is contained in the base unit 1.

A direction of acceleration to be detected of the acceleration sensing device 10 is arranged in the same direction as a vibration direction of the internal vibration plate 12. The acceleration sensing device 10 is provided in the end cap 13 as a sensing member of the detection unit 9, for precisely detecting the vibration state of the folded cantilever unit 30. The acceleration sensing device 10 is electrically connected to the electric circuit, which is contained in the base unit 1, through shielded lead wires (not shown) which are arranged to pass through the hole 12a for the acceleration sensing device 10 and the through hole 12b.

Next, operation of the above-mentioned first embodiment of the vibrator-type level sensor is described.

The vibrator-type level sensor is mounted tightly to the wall of the container 8, which contains the material to be detected, by tightening the nut 5 to the screw part 1a of the base unit 1, or by directly tightening the screw part 1a to the container 8. Therefore, a fixed end 14f of the detection pipe 14 of the folded cantilever unit 30 does not vibrate during the vibration by the vibrating device 16. The vibrator-type level sensor is constructed to vibrate the folded cantilever unit 30 which comprises the detection pipe 14, the end cap 13 and the internal vibration plate 12. Accordingly the folded cantilever unit 30 is stably vibrated at a frequency determined in accordance with an eigenfrequency of the folded cantilever unit 30 at the screw part 1a, which is a node point of the vibrating frequency. Therefore, the folded cantilever unit 30 of the vibrator-type level sensor vibrates always at substantially the same vibration state, as far as the vibrator-type level sensor is mounted to a rigid wall of container, even though the containers may have different structures, different materials or different weight, or the level sensor is fixed in different manners.

Figure 6:
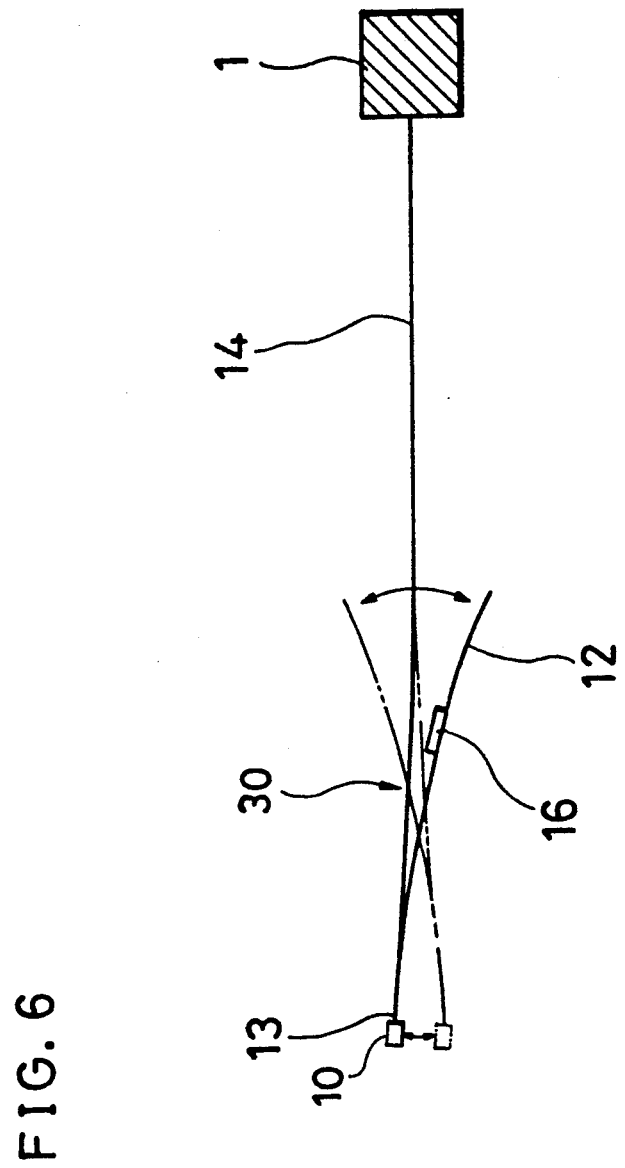
FIG. 6 is a diagram showing a vibrating folded cantilever unit in the vibrator-type level sensor of the first embodiment.

The vibration state of the above-mentioned folded cantilever is shown by a diagram of FIG. 6. As shown in FIG. 6, the detection pipe 14, the end cap 13 and the internal vibration plate 12 vibrates in a folded cantilever vibration state having its fixed end at the base unit 1 by vibrating the internal vibration plate 12 which is vibrated by the vibrating device 16. The folded cantilever vibration state is detected and converted into an electric signal by the acceleration sensing device 10 which is provided in the end cap 13. The converted electric signal is transferred to the electric circuit through the lead wire. The electric circuit amplifies the converted electric signal and applies it to the vibrating device 16 through the other lead wire (as a positive feedback loop). As a result, the folded cantilever unit 30, which comprises the detection pipe 14, the end cap 13 and the internal vibration plate 12, oscillates at a frequency determined in accordance with an eigenfrequency of the folded cantilever unit 30.

In the above-mentioned folded cantilever vibration state, when powdery or granular substance or liquid as substance 100 to be detected touches to the end cap 13 or/and detection pipe 14, the folded cantilever vibration is damped or stopped by the material to be detected. The damped or stopped vibration of the folded cantilever unit 30 appears remarkably and certainly at the end cap 13 which is provided at the end tip of the detection pipe 14. Therefore, the change of the folded cantilever vibration is detected with high-precision by the acceleration sensing device 10, which is arranged in the end cap 13 as the sensing portion. The detected vibration is converted into an electric signal, and transferred to the electric circuit which is contained in the base unit 1.

Figure 7:
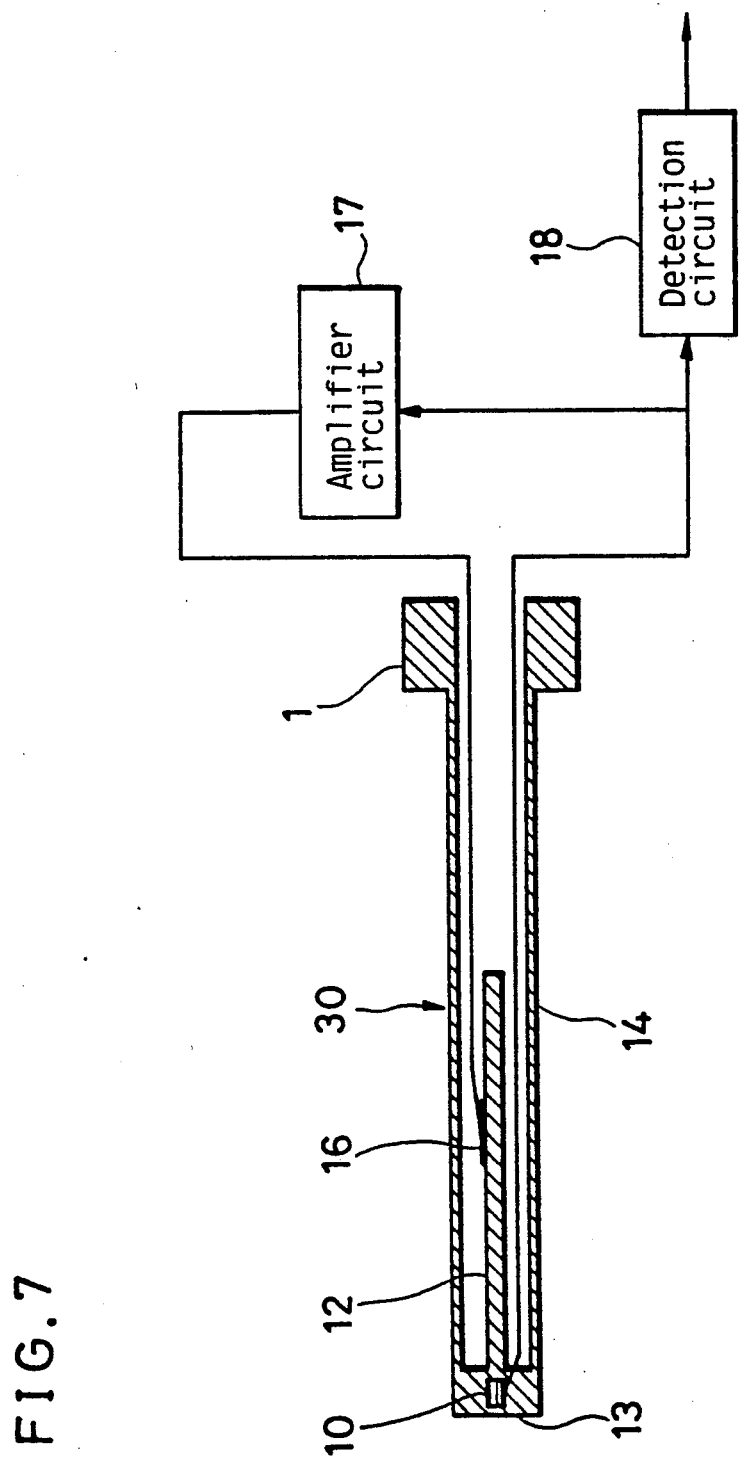
FIG. 7 is a block diagram of an electric circuit in the vibrator-type level sensor shown in FIG. 1.

FIG. 7 shows a block diagram of the above-mentioned electric circuit provided in the base unit 1 of the first embodiment. The vibrating device 16 receives an output signal from an amplifier circuit 17 for vibrating the internal vibration plate 12 and the folded cantilever unit 30, which comprises the internal vibration plate 12, the end cap 13 and the detection pipe 14, makes produces vibration in the folded cantilever vibration mode. The acceleration sensing device 10, which is provided in the end cap 13, converts the folded cantilever vibration into an electric signal. The converted electric signal is applied to the vibrating device 16 through the amplifier circuit 17 for amplifying the converted electric signal. In the first embodiment of the vibrator-type level sensor, a positive feedback loop is formed by the vibrating device 16, the folded cantilever unit 30, the acceleration sensing device 10 and the amplifier circuit 17. As a result, the folded cantilever unit 30 vibrates at a frequency determined in accordance with the eigenfrequency of the folded cantilever unit 30. Experimental study shows that the preferable ratio of the length of the detection pipe 14 to the length of the internal vibration plate 12 is between 1.6 and 3.0.

The vibration state of the folded cantilever unit 30 is detected by a detection circuit 18 which receives the output signal from the acceleration sensing device 10. And, the detection circuit 18 outputs a detection signal, which shows the vibration state of the end cap 13 wherein the acceleration sensing device 10 is provided. When the powdery or granular substance or liquid as substance 100 to be detected touches the end cap 13 or/and the detection pipe 14 of the folded cantilever unit 30, the vibration state of the end cap 13 vibrating in the folded cantilever vibration mode changes by the touching by the substance 100 to be detected. The change of the vibration state accurately appears in the output signal from the acceleration sensing device 10.

Apart from the first embodiment wherein the electric circuit comprises the amplifier circuit 17 and the detection circuit 18, a modified embodiment may be such that an electric circuit further comprises therein a comparator. In this modified embodiment, a detection signal from a detection circuit is inputted to the comparator, and the amplitude of the detection signal is compared with an amplitude of a reference signal by the comparator. When the comparator detects the detection signal data being smaller than the reference data due to touching of the substance to be detected, the comparator produces an output signal which drives a relay for controlling the supply of the material.

And further, apart from the first embodiment, wherein the positive feedback loop is formed by the vibrating device 16, the folded cantilever unit 30, the acceleration sensing device 10 and the amplifier circuit 17, a modified embodiment may be such that: a vibrator-type level sensor further comprises a receiving piezo-electric device which is provided on the internal vibration plate and converts the vibration of the internal vibration plate into an electric signal. The converted electric signal of the receiving piezo-electric device is applied to the vibrating device through an amplifier circuit which amplifies the converted electric signal. In such modified embodiment, since a positive feedback loop is formed by a vibrating piezo-electric device as the vibrating device, the receiving piezo-electric device, the amplifier circuit and the internal vibration plate can vibrate at a frequency determined in accordance with an eigenfrequency of the folded cantilever unit.

Second embodiment

Hereafter, a second embodiment of the vibrator-type level sensor of the present invention is described with reference to the accompanying drawings of FIG. 8 and FIG. 9.

Figure 8:
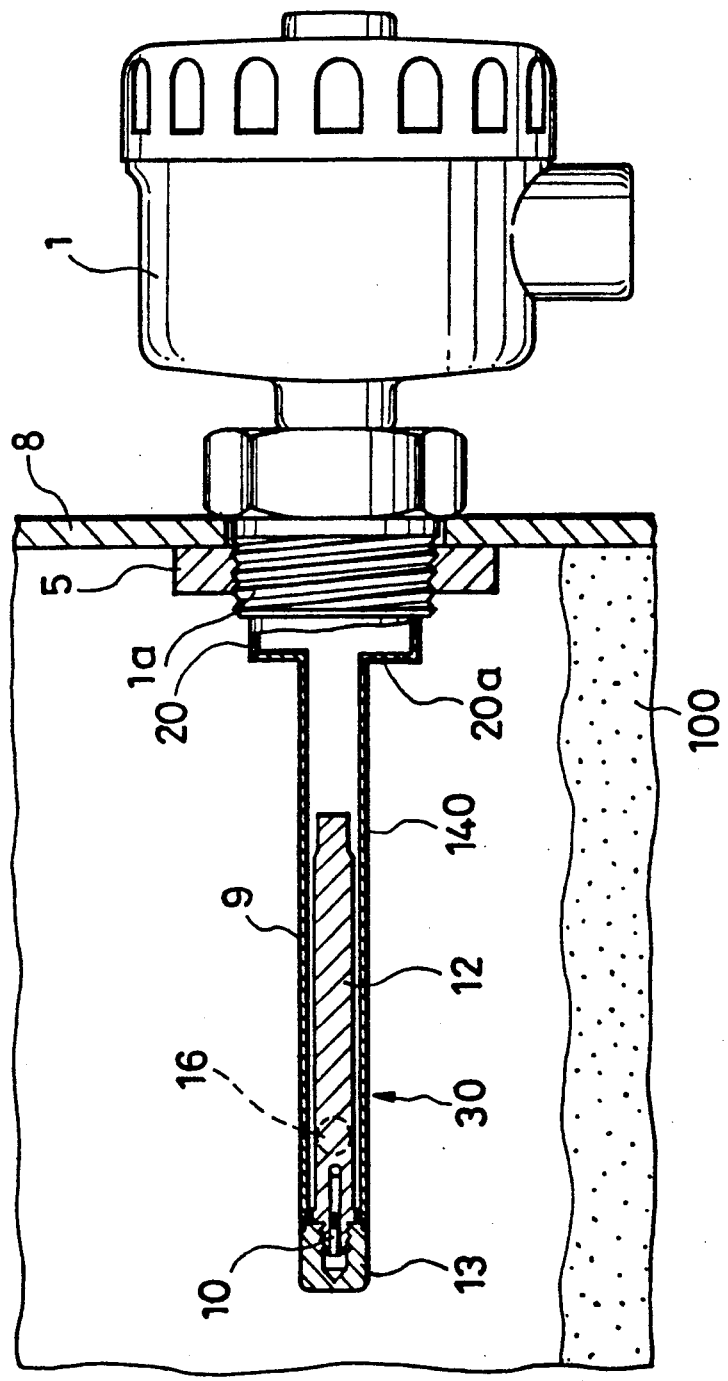
FIG. 8 is a side view, partly in cross section, of the vibrator-type level sensor of a second embodiment of the present invention.

FIG. 8 is a side view, partly in cross section, of the vibrator-type level sensor of the present invention. FIG. 9 is a diagram showing a vibrating folded cantilever unit 30 in the vibrator-type level sensor of the second embodiment. Corresponding parts and components to the first embodiment are designated by the same numerals and marks, and the description thereon made in the first embodiment similarly apply. Differences and features of this second embodiment from the first embodiment are as follows.

As shown in FIG. 8, the vibrator-type level sensor of the second embodiment comprises a base unit 1, a diaphragm unit 20 having a face 20a which is substantially parallel to the mounting surface 1 of the container 8; and a detection unit 9 having a detection pipe 140 which is arranged to project inside the container 8 from the diaphragm face 20a at substantially a right angle.

The detection unit 9 is supported by the base unit 1 through the diaphragm unit 20. Since a node of the folded cantilever vibration of the detection unit 9 is moved toward the base unit 1, because the pipe 140 is mounted to the flexible diaphragm 220 in comparison with the aforementioned first embodiment where the pipe 140 is mounted to the solid metal base 1, the detection unit 9 can be provided by a shortened detection pipe 140 as shown in FIG. 8. As shown in FIG. 8, the above-mentioned diaphragm unit 20 comprises the diaphragm face 20a which is at right angles to the axis of the projected detection pipe 140 of the detection unit 9.

Figure 9:
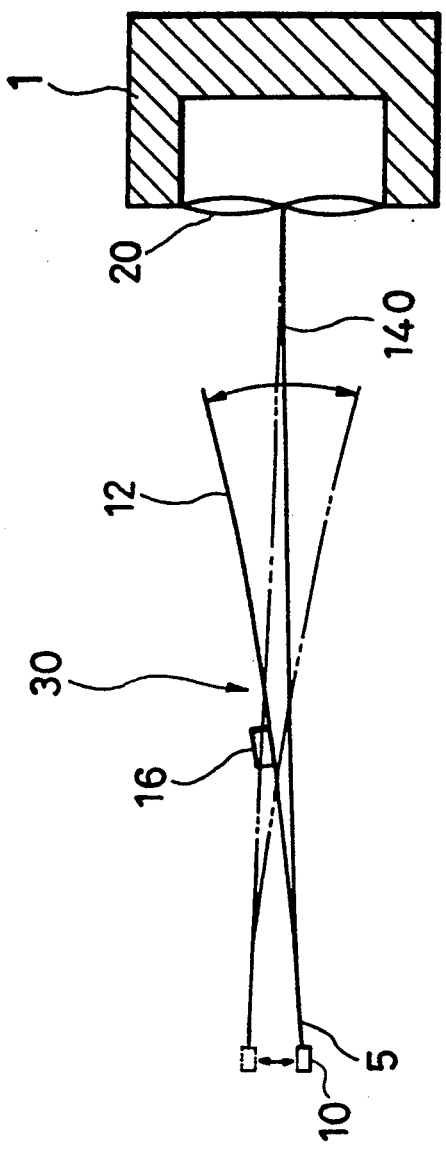
FIG. 9 is a diagram showing a vibrating folded cantilever unit in the vibrator-type level sensor of the second embodiment shown in FIG. 8.
Figure 10:
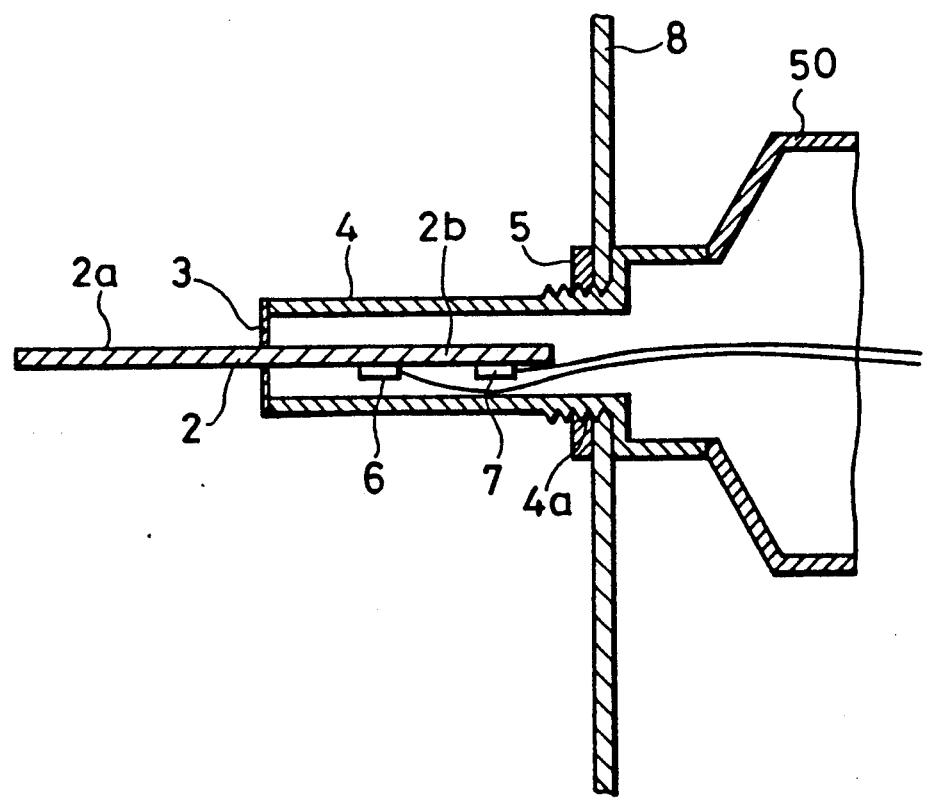
FIG. 10 is the sectional side elevational view showing the conventional vibrator-type level sensor.

The folded cantilever vibration state, which is formed by the detection pipe 140, the end cap 13 and the internal vibration plate 12, is shown by the diagram of FIG. 9. The folded cantilever unit 30 is vibrated as shown in FIG. 9 during the vibration. In order to stably vibrate the folded cantilever unit 30 at a frequency determined in accordance with the eigenfrequency of the folded cantilever unit 30, experimental study shows that the preferable ratio of the length of the detection pipe 140 to the length of the internal vibration plate 12 is between 1.0 and 2.5.

Accordingly, the vibrator-type level sensor of the second embodiment having a considerably short detection unit can be used in a small container, which is increasingly in strong demand in recent years.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A vibrator-type level sensor comprising:
    a base unit to be mounted to a container,
    a diaphragm on said base unit forming a front face,
    a detecting pipe to be located within the container, one end whereof is fixed to said diaphragm with its axis transverse to said diaphragm face as a fixed end, and the other end closed by an end cap and is a free end,
    an internal vibration member disposed in said detection pipe having an oblong rectangle bar shape fixed at one end to said end cap and having the other end thereof as a free end within said detection pipe,
    vibrating means fixed to said internal vibration member to vibrate said internal vibration member, said detection pipe, said end cap and said internal vibration member vibrating in a folded cantilever vibration mode, and
    detection means mounted in said end cap to detect a change of the vibration of said folded cantilever unit, said vibrating means comprising a self-vibration circuit of said detection means and an amplifier circuit for amplifying a detection signal from said detecting means to supply an amplified signal to said vibrating means.

2. A vibrator-type level sensor in accordance with claim 1, wherein
    said detection means comprises an acceleration sensing device for detecting acceleration of said end cap.

3. A vibratory-type level sensor in accordance with claim 1, further comprising:
    a detection circuit
    an output of said detection means being connected to an input of said detection circuit, and
    a comparator which compares an output of said detection circuit and outputs a detecting signal when the output of said detection circuit is less than a predetermined reference signal.

4. A vibrator-type level sensor in accordance with claim 1, wherein
    said vibrating means is a piezo-electric vibrating device for vibrating said internal vibration member.

* * * * *